US006929231B2

(12) United States Patent
Narehood

(10) Patent No.: US 6,929,231 B2
(45) Date of Patent: Aug. 16, 2005

(54) AUTOMATION ALIGNMENT SYSTEM AND METHOD

(75) Inventor: Abraham C. Narehood, Leicester, NC (US)

(73) Assignee: Kendro Laboratory Products, Incorporated, Asheville, NC (US)

( * ) Notice: Subject to any disclaimer, the term of this patent is extended or adjusted under 35 U.S.C. 154(b) by 131 days.

(21) Appl. No.: 10/319,815

(22) Filed: Dec. 16, 2002

(65) Prior Publication Data

US 2003/0136893 A1 Jul. 24, 2003

Related U.S. Application Data

(60) Provisional application No. 60/349,235, filed on Jan. 18, 2002.

(51) Int. Cl.[7] .............................................. F16M 11/00
(52) U.S. Cl. ..................................... 248/676; 248/678
(58) Field of Search ................................ 248/678, 676, 248/660, 669, 149, 161, 652, 657, 146, 158

(56) References Cited

U.S. PATENT DOCUMENTS

| | | | | | |
|---|---|---|---|---|---|
| 3,742,870 | A | * | 7/1973 | Gusdorf et al. | 108/150 |
| 3,986,318 | A | * | 10/1976 | McConnell | 403/384 |
| 4,033,531 | A | * | 7/1977 | Levine | 248/558 |
| 4,118,002 | A | * | 10/1978 | Bartlett | 248/311.2 |
| 4,295,308 | A | * | 10/1981 | Korfanta | 52/296 |
| 5,362,019 | A | * | 11/1994 | Swanson | 248/146 |
| 5,407,171 | A | * | 4/1995 | Gonzalez | 248/670 |
| 6,361,001 | B1 | * | 3/2002 | Durand | 248/146 |

* cited by examiner

*Primary Examiner*—Ramon O. Ramirez
(74) *Attorney, Agent, or Firm*—Baker & Hostetler, LLP

(57) ABSTRACT

An apparatus for alignment of an automation system used in low temperature refrigeration systems. An alignment system is provided to move the automation system along an X, Y, Z or other coordinate axis by adjusting fasteners and moving the automation system along a direction defined by a set of slots. The adjustment allows for more accurate alignment that is required in the automation system.

21 Claims, 3 Drawing Sheets

AUTOMATION ALIGNMENT SYSTEM AND METHOD

PRIORITY

This application claims benefit of U.S. provisional patent application Ser. No. 60/349,235, filed Jan. 18, 2002, which is herein incorporated by reference.

FIELD OF THE INVENTION

The present invention relates generally to an integrated automation system of an environmental unit, such as for example, a refrigeration unit. More particularly, the present invention relates to alignment of laboratory automation systems in freezers, such as for example, an ultra low temperature freezer.

BACKGROUND OF THE INVENTION

In order to conduct research, scientists often have to prepare samples for use in the laboratory. The samples can be stored in bottles and some can be separated by electrophoresis gels and used with later tests. However, due to time and equipment constraints, the scientist often can not run all of the samples that are prepared and must store some of them for later use. Ultra low temperature freezers are often utilized to store such sample bottles, thereby increasing the "shelf life" of the samples. The freezer can have several shelves to store the sample bottles and may have an automation system, such as for example, an integrated automation specimen pick-and-place system to retrieve stored sample bottles or to place the sample bottles in the freezer.

In conventional automation systems, it is necessary to align the sample bottles in a plane defined by the automation system and its robot member. By knowing where the samples are stored or will be stored, the robot member can be programmed with information to allow for precise pick up of the sample bottles. This step typically requires a cumbersome and time consuming alignment process that lacks the precision needed in a three-dimensional space using the X, Y, and Z coordinate axis or other axes. Current manufacturing processes for ultra low temperature freezers are limited in their ability to achieve the precision that is required to align such automation systems.

If there is a large misalignment between the automation system and the freezer shelves, the sample bottles can not be picked up properly or the sample bottles may be knocked off the shelf. The destruction of the sample bottles and their sample may mean destroying months or years worth of research, particularly when the specimens are rare. Additionally, any spill may cause laboratory down time for clean up and containment of the spill, especially when the samples are radioactive. Further, a technician may have to realign the automation system to bring the robot member into proper alignment with the sample bottles. After realignment of the samples with the robot arm, the automation sequence is repeated until alignment is confirmed. This realignment process can be a time consuming step of the entire process, and if not performed correctly, can potentially jeopardize the quality of the sample during manipulation and can increase laboratory down time.

It can be appreciated that conventional automation systems do not provide a fast and effective technique for aligning the robot member with the sample bottles. Additionally, conventional automation systems lack the precision alignment that is required for effective transfers of sample bottles to and from the freezers. The problem is exasperated when a carousel system is used resulting in possibly both translational and rotational alignment errors.

Therefore, there is a need for an alignment system that can easily and quickly align the automation system and the robot member with the sample bottles. There is also a need for an alignment system that can be adapted to be utilized with conventional automation systems.

SUMMARY OF THE INVENTION

Embodiments of the present invention generally provide for an improved alignment method and system that can quickly and easily align automation systems within a freezer.

In one embodiment, an alignment system for an automation system can include a support member having a first end coupled to the automation system and a second end, a first plate coupled to the second end of the support member, at least one first fastener that can fasten the support member to the first plate, and at least one first slot in the support member that can receive at least one respective fastener. The at least one first slot can be a plurality of first slots and the at least one first fastener can be a plurality of first fasteners. The alignment system can further include a second plate height adjustably coupled to the first plate for adjusting the height of the automation system. The alignment system can further include a third plate is disposed between the automation system and the first end of the support member for height adjustment of the automation system. The at least one first fastener can fasten the first plate and the second plate and the first plate has at least one second slot therein that can receive at least one respective first fastener. The at least one first slot may be a plurality of first slots, the at least one first fastener may be a plurality of first fasteners, and the at least one second slot may be a plurality of second slots. The at least one slot may be elongated in a direction that can define the direction of movement of the support member. The at least one first slot can be elongated in more than one direction. The support member can move along an axis, said axis is selected from a group consisting of an X axis, a Y axis, and a Z axis, other axis and a combination thereof. The first plate can move along an axis, said axis can be an X axis, a Y axis, and a Z axis, other axis and a combination thereof. The at least one first fastener can fasten the third plate and the support member. The at least one first fastener can be bolts, screws, other fasteners, other height adjusters and a combination thereof. The height of the second plate can be adjustable by at least one of set screw or other height adjuster.

A method of aligning an automation system is also provided and can include unfastening at least one fastener that can be received in at least one respective slot in a support member, aligning the support member along at least one of an X, Y or Z coordinate system, with the support member coupled to the automation system at a first end and a first plate at a second end, and fastening the at least one fastener once aligning is completed. The at least one fastener can fastens the support member to the first plate. The at least one slot can be a plurality of slots and the at least one fastener can be a plurality of fasteners. The aligning the support member can include moving the support member along a direction defined by the elongation of the at least one slot. Unfastening the at least one fastener can be accomplished by turning the fastener in a first direction and fastening the at least one fastener can be accomplished by turning the fastener in a second direction. Aligning the support member can be accomplished by adjusting the at least one fastener in one of a first direction and a second direction. The aligning method can also include adjusting the height of the support member by turning a height adjustment member that can be received in the support member.

An alignment system for an automation system can include a means for supporting the automation system, a means for fastening the supporting means to a base means, and a means for receiving the fastening means being provided in the means for supporting. The supporting means can be moved along at least one of an X axis a Y axis, a Z axis, other axis or a combination thereof. The means for supporting can be moved along a direction defined by the means for receiving. The means for receiving can be at least one slot. The means for fastening can be selected from bolts, screws, other fasteners, other height adjusters and a combination thereof. The alignment system can also include a means for adjusting the height of the supporting means.

In another embodiment, an alignment system for an automation system can include a support member having a first end coupled to the automation system and a second end, a first plate coupled to the second end of the support member, at least one first fastener that can fasten the support member to the first plate, and at least one first slot in the first plate that can receive at least one respective fastener.

In still another embodiment, an alignment system for an automation system can include a support member having a first end coupled to the automation system, at least one first fastener that fastens the support member to the automation system, and at least one first slot in the support member that can receive at least one respective fastener.

In a further embodiment, an alignment system for an automation system a support member having a first end coupled to the automation system, at least one first fastener that can fasten the support member to the automation system, and at least one first slot in the automation system that can receive at least one respective fastener.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
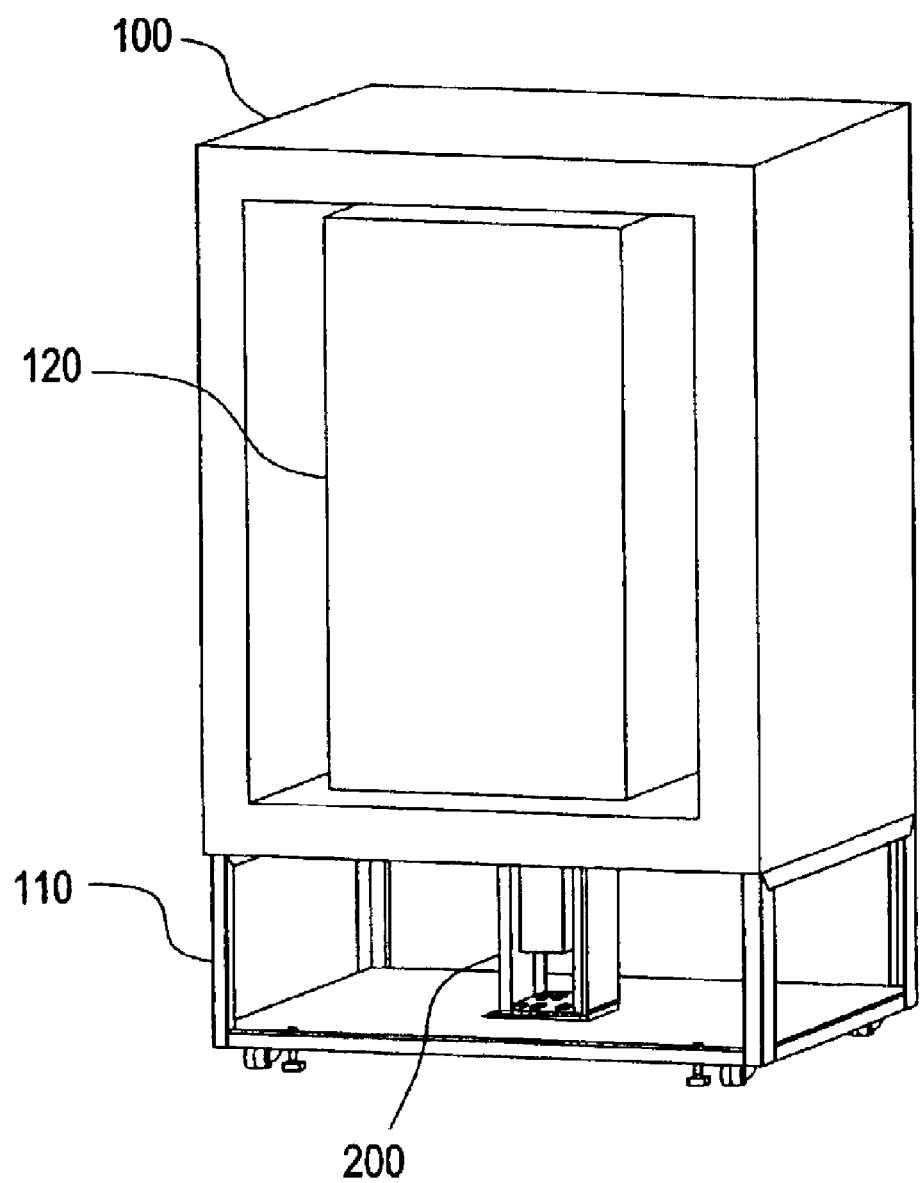
FIG. 1 is a perspective view of an environmental unit, such as a freezer, and an alignment system.

FIG. 1 is a perspective view of an environmental unit, such as a freezer 100, and an alignment system 200. The freezer 100 may be any conventional freezer, such as for example, an ultra low temperature freezer or similar types of freezers. The freezer 100 can be supported by a freezer support structure 110, which can be in direct contact with a floor. The freezer support structure 110 can also provide support for the alignment system 200, which may be coupled to an automation system 120. The automation system 120 may be positioned within the freezer 100, which is shown with its outer door omitted for clarity. The alignment system 200 may be used to align the automation system 120 within the freezer 100. In some embodiments, the freezer 100 has a cabinet that supports shelves or storage locations for the sample bottles. The automation system 120 can be, for example, any system, such as a carousel type, having a robot member in the middle which can have access to areas around it, or other conventional automation system having a robot member that is capable of removing or placing sample bottles within the freezer 100 on storage locations, for example, on the shelves. Thus, the alignment system 200 can align the robot arm with the shelves, as desired.

Figure 2:
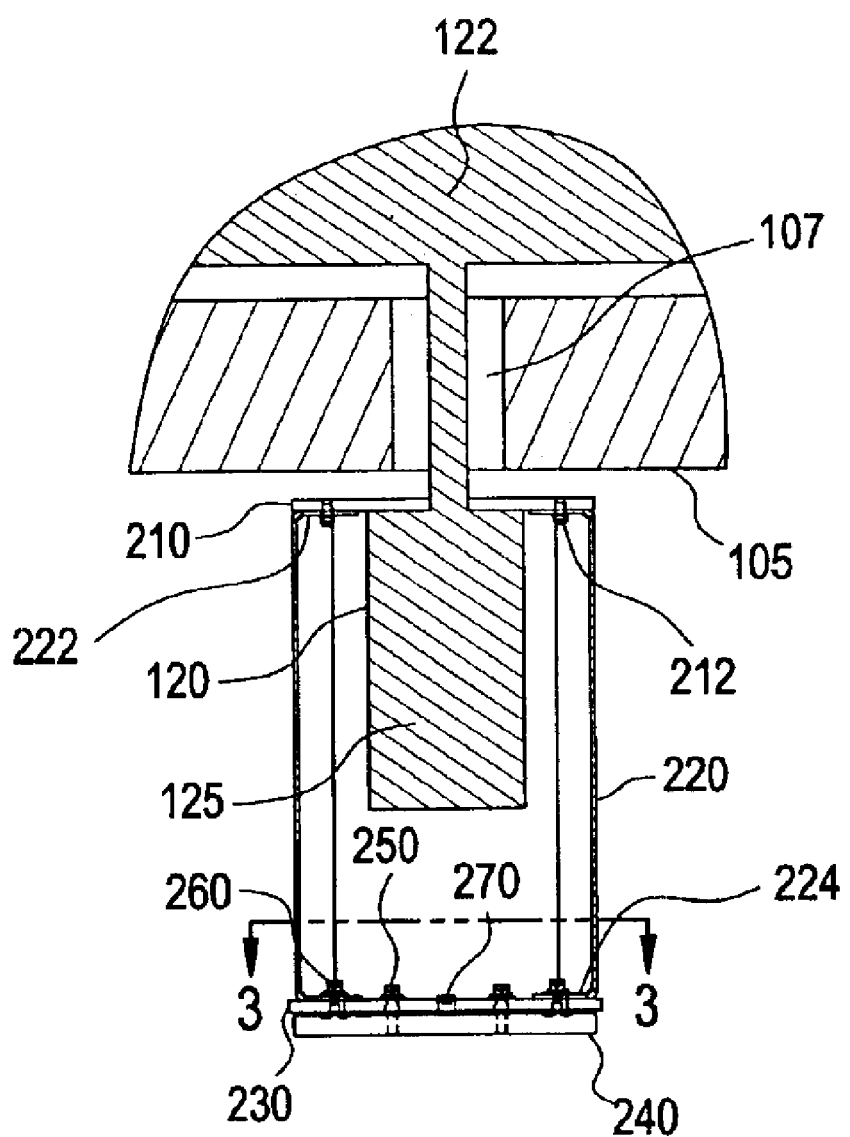
FIG. 2 is a cross-sectional view of one embodiment of the alignment system.

FIG. 2 is a cross-sectional view of one embodiment of the alignment system 200. The freezer 100 has an opening 107 at its bottom 105 that can receive a first portion 122 of the automation system 120. The first portion 122 can reside inside the freezer 100 so that a robot member of the automation system 120 can interact with the sample bottles. A second portion 125 of the automation system 120 can be mounted with a mounting plate 210 of the alignment system 200. The mounting plate 210 may be fastened by a first set of fasteners 212 to a first end 222 of a support 220. A second end 224 of the support 220 may be fastened to an adjustment plate 230 by a second set of fasteners 260. The adjustment plate 230 can be fastened to a fixed plate 240 by a third set of fasteners 250. Alternatively, the adjustment plate 230 can also be fastened to the fixed plate 240 by the second set of fasteners 260. The fixed plate 240 in turn can be fastened to the freezer support structure 110 or other structures by welding or other fasteners. The adjustment plate 230 and the support 220 can be moved along the conventional X, Y, and Z coordinate axis by adjusting the second and third sets of fasteners 250, 260 or height adjustment members, such as set screws 270.

FIG. 3 is a view along section 3—3 of FIG. 2 showing the adjustment mechanisms of one preferred embodiment of the present invention. The second end 224 of the support 220 can be fastened to the adjustment plate 230 by the second set of fasteners 260. A first set of slots 262 are provided to allow movement of the support 220 in relation to the adjustment plate 230. By turning or torquing (loosening) the second set of fasteners 260 to a predetermined amount in a first direction, the second end 224 of the support 220 can move as defined by the first set slots 262 (left to right in this view on paper). Once the desired movement of the automation system 120 is completed, the second set of fasteners 260 may be turned in a second direction (or opposite the first direction) in order to fasten the support 220 to the adjustment plate 230. The turning of the fasteners 250, 260 or the set screws 270 may be done by any torquing apparatus, such as a wrench, screwdrivers, or pliers, so long as the fasteners are able to be turned in the desired directions.

The adjustment plate 230 can be fastened to the fixed plate 240 by the third set of fasteners 250. Adjustment plate 230 can have a second set of slots 252 thereon to allow movement of the adjustment plate in relation to the fixed plate 240. By turning the third set of fasteners 250 by a predetermined amount in the first direction, the adjustment plate 230 can move as defined by the second set of slots 252 (up and down in this drawing view). Once the desired movement of the adjustment plate 230 is completed, the third set of fasteners 250 may be turned in the second direction in order to fasten the adjustment plate 230 to the fixed plate 240.

To make vertical or height adjustments (up or down on the Y axis), set screws 270, which can be threaded into the adjustment plate 230, can be turned to the desired height and move the adjustment plate 230 in relation to the fixed plate 240. The movement of the adjustment plate 230 vertically will also move the automation system 120 in the vertical direction.

Figure 3A:
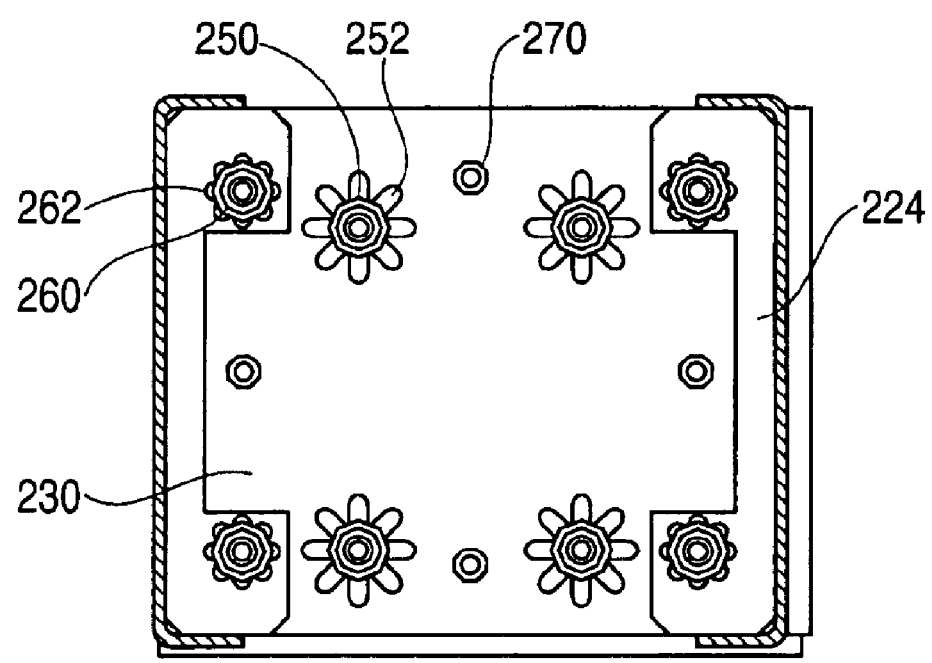
FIG. 3 is a view along section 3—3 of FIG. 2 showing the adjustment mechanisms of one preferred embodiment of the present invention.

In a first alternative embodiment of the invention, the first set of slots 262 and the second sets of slots 252 may permit movement in more than one direction. FIG. 3A illustrates the first set of slots 262 and the second set of slots 252 having slots in more than one direction. By having slots that extend in more than one direction, alignments may be made for the automation system 120. The slots may have as many directions as the user requires, and may be for example cross-shape, or asterisk-shape. Additionally, by having slots extending in more than one direction, it is possible to loosen only one set of fasteners instead of two in order to align the automation system 120 in the desired directions. In other words, it is possible to loosen the third set of fasteners 250 in order to align the automation system 120 in the desired directions without loosening the second set of fasteners 260.

In a second alternative embodiment of the invention (not shown), the mounting plate 210 may have fasteners such as fasteners 212 that fasten it to the support 220. The support 220 may have slots therein similar to the ones previously described. Additionally, the slots may also run in more than one direction, for example in a cross-shape or asterisk-shape, in order to align the automation system 120. The fasteners 212 may be loosened so that the mounting plate 210 may move along the slots and then refastened when the alignment is completed. Further, the first end 222 of the support 220 may include set screws 270 in order to provide vertical movement of the mounting plate 210.

In a third alternative embodiment, the second portion 125 of the automation system 120 can be mounted directly on the first end 222 of the support 220 instead of being mounted on the mounting plate 210. The second portion 125 can be mounted in any matter, such as being welded, fastened or other means, so long as the automation system 120 can be moved when the support 220 is moved. The second end 224 of the support 220 can be fastened on the alignment plate 230 by the second set of fasteners 260. The second set of fasteners 260 can be received in slots 262. The adjustment plate 230 can be fastened to the fixed plate 240 by the third set of fasteners 250, which can be received in slots 252. Additionally, the slots 252, 262 may also extend in more than one direction, for example in a cross-shape or asterisk-shape, in order to align the automation system 120.

Although bolts are shown as examples of fasteners that fasten the plates and the support, any fastening means, such as a rod and a nut, that do not permanently fasten the plates 230, 240 and the support 220 together may be used. Additionally, although set screws 270 are given as an example of a height adjustment member, other types of screws or devices can be used so that when the height adjustment member is operated, it can raise or lower the automation system 120. Additionally the movements left, right, up and down are not limiting and are meant to be examples of movement in the X, Y, and Z coordinate axis. Other movements along various other axes can also be accomplished.

The many features and advantages of the invention are apparent from the detailed specification, and thus, it is intended by the appended claims to cover all such features and advantages of the invention, which fall within the true spirits and cope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An alignment system for an automation system, comprising:
    a support member having a first end coupled to the automation system and a second end;
    an adjustment plate coupled to the second end of the support member;
    at least one first fastener that fastens the support member to the adjustment plate;
    at least one first slot in the support member that receives the at least one first fastener; and
    a fixed plate coupled to the adjustment plate that adjusts the height of the automation system by allowing movement between the fixed plate and the adjustment plate.

2. The alignment system of claim 1, wherein the at least one first slot is a plurality of slots and the at least one first fastener is a plurality of fasteners.

3. The alignment system of claim 1 further comprising a mounting plate disposed between the automation system and the first end of the support member.

4. The alignment system of claim 1, wherein the at least one slot is elongated in a direction that defines the direction of movement of the support member.

5. The alignment system of claim 1, wherein the at least one first slot is elongated in more than one direction.

6. The alignment system of claim 1, wherein the support member can move along an axis, said axis is selected from a group consisting of an X axis, a Y axis, and a Z axis, other axis and a combination thereof.

7. The alignment system of claim 1, wherein the adjustment plate can move along an axis, said axis is selected from a group consisting of an X axis, a Y axis, a Z axis, other axis and a combination thereof.

8. The alignment system of claim 1, wherein the at least one first fastener is selected from a group consisting of bolts, screws, other fasteners, and a combination thereof.

9. The alignment system of claim 1, wherein the height of the adjustment plate is adjustable by a set screw.

10. A method of aligning an automation system, comprising:
    unfastening at least one fastener that is received in at least one slot in a support member;
    aligning the support member along at least one of an X, Y and Z coordinate system, with the support member coupled to the automation system at a first end and a adjustment plate at a second end;

fastening the at least one fastener once aligning is completed; and adjusting the height of the support member by turning a height adjustment member that is received in the support member.

11. The alignment method of claim 10, wherein the at least one fastener fastens the support member to the adjustment plate.

12. The alignment method of claim 10, wherein the at least one slot is a plurality of slots and the at least one fastener is a plurality of fasteners.

13. The aligning method of claim 10, wherein aligning the support member includes moving the support member along a direction defined by the elongation of the at least one slot.

14. The aligning method of claim 10, wherein unfastening the at least one fastener is accomplished by turning the fastener in a first direction.

15. The aligning method of claim 10, wherein fastening the at least one fastener is accomplished by turning the fastener in a second direction.

16. The aligning method of claim 10, wherein aligning the support member is accomplished by adjusting the at least one fastener in one of a first direction and a second direction.

17. An alignment system for an automation system, comprising:

means for supporting the automation system;

means for fastening the supporting means to a base means;

means for receiving the fastening means being provided in the means for supporting; and means for adjusting the height of the supporting means, wherein said means for adjusting is a fixed plate coupled to an adjustment plate that adjusts the height of the automation system by allowing movement between the fixed plate and the adjustment plate.

18. The alignment system of claim 14, wherein the supporting means can be moved along at least one of an X axis, a Y axis, a Z axis, other axis or a combination thereof.

19. The alignment system of claim 10, wherein the means for supporting can be moved along a direction defined by the means for receiving.

20. The alignment system of claim 10, wherein the means for receiving is at least one slot.

21. The alignment system of claim 10, wherein the means for fastening is selected from a group consisting of bolts, screws, and other fasteners.

* * * * *